United States Patent
Esser et al.

(10) Patent No.: US 6,729,460 B2
(45) Date of Patent: May 4, 2004

(54) RAPID DEPLOY ROLLER TRANSFER DEVICE

(75) Inventors: Richard A. Esser, Glenn Dale, MD (US); Chad Sample, Glenn Dale, MD (US)

(73) Assignee: TVI Corporation, Glen Dale, MD (US)

( * ) Notice: Subject to any disclaimer, the term of this patent is extended or adjusted under 35 U.S.C. 154(b) by 0 days.

(21) Appl. No.: 09/819,618

(22) Filed: Mar. 29, 2001

(65) Prior Publication Data

US 2001/0045339 A1 Nov. 29, 2001

Related U.S. Application Data (60) Provisional application No. 60/193,450, filed on Mar. 31, 2000.

(51) Int. Cl.[7] .............................................. B65G 13/00
(52) U.S. Cl. .............................. 193/35 TE; 193/35 MD
(58) Field of Search ........................ 193/35 TE, 35 MD (56) References Cited

U.S. PATENT DOCUMENTS

| | | | | | |
|---|---|---|---|---|---|
| 3,444,973 A | * | 5/1969 | Nygren | .................. | 193/35 MD |
| 4,381,054 A | * | 4/1983 | Rumpel | ................ | 193/35 MD |
| 4,473,986 A | | 10/1984 | Zeigler | ........................ | 52/645 |
| 4,512,097 A | | 4/1985 | Zeigler | ........................ | 40/611 |
| 4,522,008 A | | 6/1985 | Zeigler | ........................ | 52/646 |
| 4,561,618 A | | 12/1985 | Zeigler | ........................ | 248/166 |
| 4,579,066 A | | 4/1986 | Zeigler | ........................ | 108/157 |
| 4,637,180 A | | 1/1987 | Zeigler | ........................ | 52/109 |
| 4,689,932 A | | 9/1987 | Zeigler | ........................ | 52/648 |
| 4,747,239 A | | 5/1988 | Zeigler | ........................ | 52/109 |
| 4,761,929 A | | 8/1988 | Zeigler | ........................ | 52/646 |
| 4,800,663 A | | 1/1989 | Zeigler | ........................ | 40/610 |
| 4,838,003 A | | 6/1989 | Zeigler | ........................ | 52/646 |
| 4,852,712 A | * | 8/1989 | Best | ........................ | 193/35 TE |
| 4,970,841 A | | 11/1990 | Zeigler | ........................ | 52/646 |
| RE33,710 E | | 10/1991 | Zeigler | ........................ | 52/648 |
| 5,147,025 A | * | 9/1992 | Flippo | ..................... | 198/35 TE |
| 5,230,196 A | | 7/1993 | Zeigler | ........................ | 52/646 |
| 5,274,980 A | | 1/1994 | Zeigler | ........................ | 52/646 |
| 5,444,946 A | | 8/1995 | Zeigler | ........................ | 52/86 |
| 5,651,228 A | | 7/1997 | Zeigler | ........................ | 52/646 |
| 5,794,640 A | | 8/1998 | Jang | | |
| 6,003,658 A | * | 12/1999 | Best et al. | .............. | 193/35 TE |
| 6,141,934 A | | 11/2000 | Zeigler | ........................ | 52/646 |

FOREIGN PATENT DOCUMENTS

| | | |
|---|---|---|
| EP | 0 353 999 | 2/1990 |
| FR | 1 105 645 A | 12/1955 |
| WO | WO 92 04510 A | 3/1992 |

* cited by examiner

Primary Examiner—Joseph E. Valenza
(74) Attorney, Agent, or Firm—Finnegan, Henderson, Farabow, Garrett & Dunner LLP (57) ABSTRACT

A portable rapidly deploying roller transfer device is disclosed, which is adapted to receive and convey objects. The transfer device may be rapidly manipulated between an elongated open configuration and a collapsed compact configuration. The framework of the transfer device includes rods, hubs, and a canopy. Each rod pivotally joins to another rod by a scissors-type connection intermediate the rod ends. In addition, the end portion of each rod pivotally joins to a hub, where each hub may receive a plurality of rods. As configured, each rod enjoys pivotal movement in relation to the hub along a single axis of revolution. The rods rotate about this single axis of revolution from the collapsed compact configuration, where the rods are substantially parallel to one another, to the erect open configuration, where the rods radiate outwardly from one another and the framework of the transfer device assumes a rectangular prism shape. In this erect configuration, the transfer device receives ball transfers disposed on the hubs positioned along the upper external portion. To transport objects, they are simply received and conveyed along the ball transfers.

26 Claims, 9 Drawing Sheets

RAPID DEPLOY ROLLER TRANSFER DEVICE

RELATED APPLICATIONS

This patent application claims priority to Provisional U.S. Patent Application No. 60/193,450, entitled "Rapid Deploy Roller Transfer Device," filed on Mar. 31, 2000, which is herein incorporated by reference.

BACKGROUND OF THE INVENTION

1. Field of the Invention

The present invention generally concerns the design and operation of loading and unloading systems. More particularly, the present invention is directed toward a portable rapid deploying roller transfer device for conveying objects of varying size and shape.

2. Description of the Related Art

Efficient loading and unloading of cargo or other objects is a continuous problem for industries that involve transport in their normal course of business. From shipping to emergency medicine, or any other field involved in time sensitive transport, there exists legal, economic and other consequences that result from unnecessary delays.

For example, in the shipping industry alone, substantial resources are expended in an attempt to shorten delivery time. Indeed, the trucking industry is continually faced with situations requiring immediate loading/unloading of objects from or to a vehicle, storage facility, or the like. Because these procedures occur repeatedly, a rapid and cost-effective transferring procedure may not only conserve resources but also shorten delivery time. The concerns presented by timely and cost-effective delivery of cargo or other objects creates a specific need for a practical device capable of rapid loading/unloading of objects.

Figure 1:
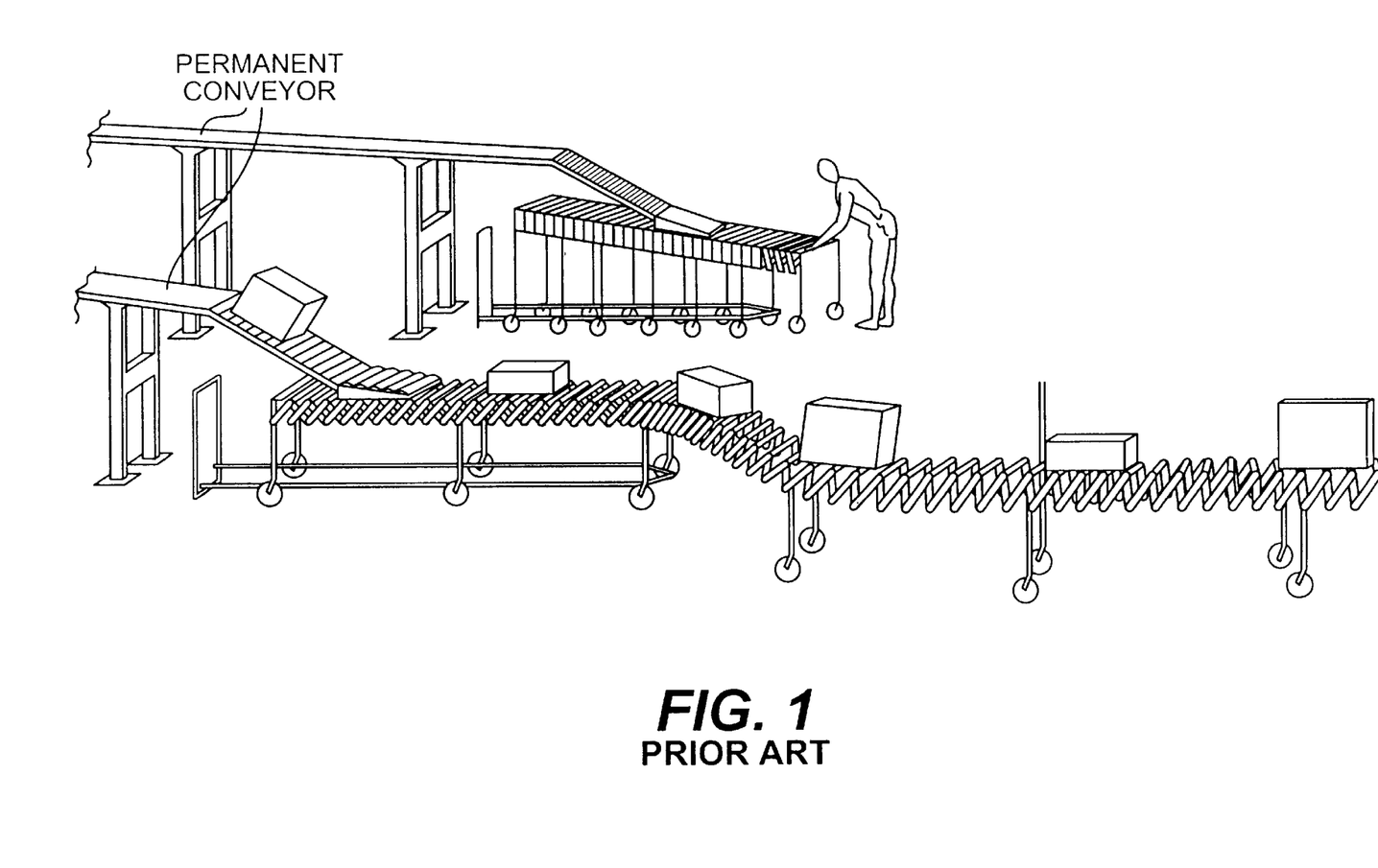
FIG. 1 is a perspective view illustration of the conventional transfer device of the prior art.
Figure 2:
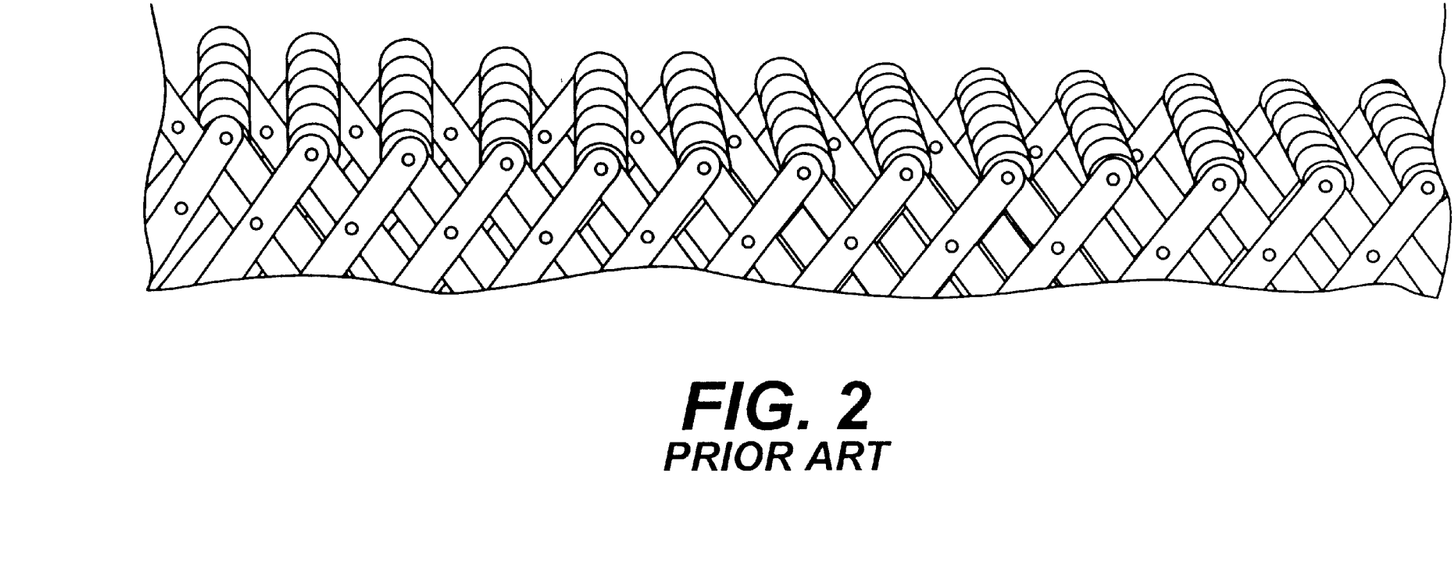
FIG. 2 is a perspective view illustration of a conventional transfer device of the prior art.

There presently exist devices for loading/unloading of objects that require efficient transport in shipping. But the procedures and configurations of these devices are cumbersome and, therefore, impractical for efficient use. Indeed, many conventional transfer devices are labor intensive and can require one or more workers specially trained in using heavy machinery, such as a fork-lift, to load/unload cargo. As such, these devices fail to provide a rapid cost-effective means for transferring objects. Other conventional devices fail to provide a rigid portable transfer device capable of rapidly deploying from an open elongated configuration to a closed compact configuration. For example, as illustrated in FIGS. 1 and 2, conventional expandable conveyor systems have failed to maximize on their closed compact configuration, mainly because their frame and hinged roller configurations permit articulation along only one plane. Because of these and other deficiencies, the devices currently available in the shipping industry for conveying objects from or to a vehicle, storage facility, or the like are impractical for rapid and cost-effective loading/unloading.

Although similar to the shipping industry, in that it involves time-sensitive transport, the emergency medicine field differs in the gravity of consequences resulting from unnecessary delays, as mere seconds can be the difference between life and death. For example, in situations involving mass casualty or high-impact accidents, substantial resources are expended simply in transporting patients from the accident site to a safe location for patient monitoring and triage. These mass casualty incidents, which range from common multiple vehicle accidents to rare terrorist bombings or mass chemical contaminations, often involve injuries to many individuals that require immediate medical attention. To ensure that a majority of those injured survive, the ability to transport patients from the accident site to safety must be efficient and require minimal resources.

Presently, emergency medical service (EMS) personnel employ impractical and inefficient devices and techniques for patient transport. Patients are typically transported along a flat board carried by at least two EMS personnel. In situations involving only one patient requiring medical attention, such a procedure may be deemed adequate, even though still impractical and inefficient. But where many patients require immediate medical attention, there is a need for a device and procedure that reduces the involvement of EMS personnel and shortens overall transport time.

In view of the limitations and complexity of existing transfer devices and procedures, a need has arisen for a transfer device which is simple in its application as well as construction, and capable of rapidly deploying from a closed compact configuration to an open erect configuration.

SUMMARY OF THE INVENTION

The advantages and purpose of the invention will be set forth in part in the description which follows, and in part will be obvious from the description, or may be learned by practice of the invention. The advantages and purpose of the invention will be realized and attained by means of the elements and combinations particularly pointed out in the appended claims.

To attain the advantages and in accordance with the purpose of the invention, as embodied and broadly described herein, the invention comprises a portable rapidly deploying roller transfer device which may be easily adapted to load and unload objects of varying dimensions. The transfer device is movable between an erect open elongated configuration and a collapsed compact configuration. In the elongated configuration, the transfer device includes an upper surface having exposed hubs which receive stud-mounted ball transfers. The objects being loaded/unloaded are received and conveyed along these ball transfers, which mount on the upper surface hubs of the open frame of the transfer device. To permit rapid deployment, the transfer device comprises rods, where each rod is pivotally joined to another rod by a scissors-type connection intermediate the ends of the rod; and hubs, where each hub receives an end portion of at least two rods along a separate axis of the hub, such that the rods are pivotally joined to the hubs and each rod pivots in relation to the hub along a single axis of rotation. The rods rotate about this single axis of revolution from the collapsed configuration. To add strength and adaptability to the open configuration, a fastening mechanism connecting opposing hubs of the transfer device may be added.

Additional objects and advantages of the invention will be set forth in part in the description which follows and in part will be obvious from the description, or may be learned by practice of the invention. The objects and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in an constitute a part of this specification, illustrate preferred embodiments of the invention and, together with the description, serve to explain the principles of the invention. In the drawings.

DESCRIPTION OF THE EMBODIMENTS

Reference will now be made in detail to the present embodiment of the invention, an example of which is illustrated in the accompanying drawings. Wherever possible, the same reference numbers will be used throughout the drawings to refer to the same or like parts.

The technical disclosures of U.S. Pat. No. 5,943,837, U.S. Pat. No. 6,244,011, and pending U.S. patent application Ser. No. 09/689,615, entitled "Rapid Deploy Hazmat Containment Device" and filed Oct. 13, 2000 are incorporated herein by reference. As used herein, the incorporation of a "technical disclosure" excludes incorporation of information characterizing the related art, or characterizing advantages or objects of this invention over the related art. The technical disclosure of these references describe hubs, frames, and hub assemblies for quick erect devices.

In accordance with the invention, there is provided a portable rapidly deploying roller transfer device capable of receiving and conveying objects. The transfer device is movable between an elongated open configuration and a collapsed compact configuration. In the elongated configuration, the transfer device includes an upper surface having exposed hubs which receive stud-mounted ball transfers, which mount along the upper surface hubs of the transfer device.

As illustrated in the drawings, to facilitate rapid deployment, transfer device 10 comprises rods 12, where each rod 12 is pivotally joined to another rod 12 by a scissors-type connection intermediate the ends of rods 12. Transfer device 10 also includes hubs 14, where each hub 14 receives an end portion of at least two rods 12 along a separate axis of hub 14, whereby rods 12 are pivotally joined to hubs 14 and each rod 12 pivots in relation to hub 14 along a single axis of rotation. This configuration allows rods 12 to rotate about the single axis of rotation from the collapsed configuration, where rods 12 are substantially parallel to one another, to the elongated open configuration. Preferably, hubs 14 positioned proximate the top portion of the collapsed configuration descend downward toward the bottom portion of the collapsed configuration when converting from the collapsed configuration to the erect configuration.

The transfer device of the present invention is a complete integrated, modular structure, which is rugged and flexible in design. The transfer device is designed for rapid setup as well as rapid breakdown. The structure includes ball transfers 18 that are affixed to the external upper surface hubs of open frame 19. As disposed, ball transfers 18 provide a conveying means along the upper surface of open frame 19 that facilitates loading and unloading of cargo or other objects. The transfer device, in its open elongated configuration, is self-supporting, thus eliminating the need for supplementary erection devices, such as push poles and supplementary support devices, such as center poles.

The self-supporting nature of transfer device 10 is derived from articulate frame 19. Again, frame 19 includes a plurality of rods 12 interconnected to hubs 14 by pivotal joints. Each hub 14 may interconnect with as many as four rods 12. The structure of transfer device 10 is arranged such that the plurality of rods 12 and hubs 14 form a lattice framework. In the expanded erect configuration, this lattice framework forms an elongated frame 19 having a conveyor-type upper surface configuration in which ball transfers 18 are located to form the basic conveying means for the transfer device. Preferably, those hubs 14 located along the external upper portion of frame 19 include holes 20 which enable ball transfers 18 to attach to hub 14 by a stud mount 22 or other affixing means. The self supporting nature of transfer device 10 is derived, at least in part, from the post-tensioning of rods 12 and hubs 14. For example, to manipulate transfer device 10 from its collapsed compact configuration to its open expanded erect configuration, those hubs positioned proximate the top portion of the collapsed configuration descend downward toward the bottom portion of the collapsed configuration, thus, providing post-tension between rods 12 and hubs 14.

Figure 4:
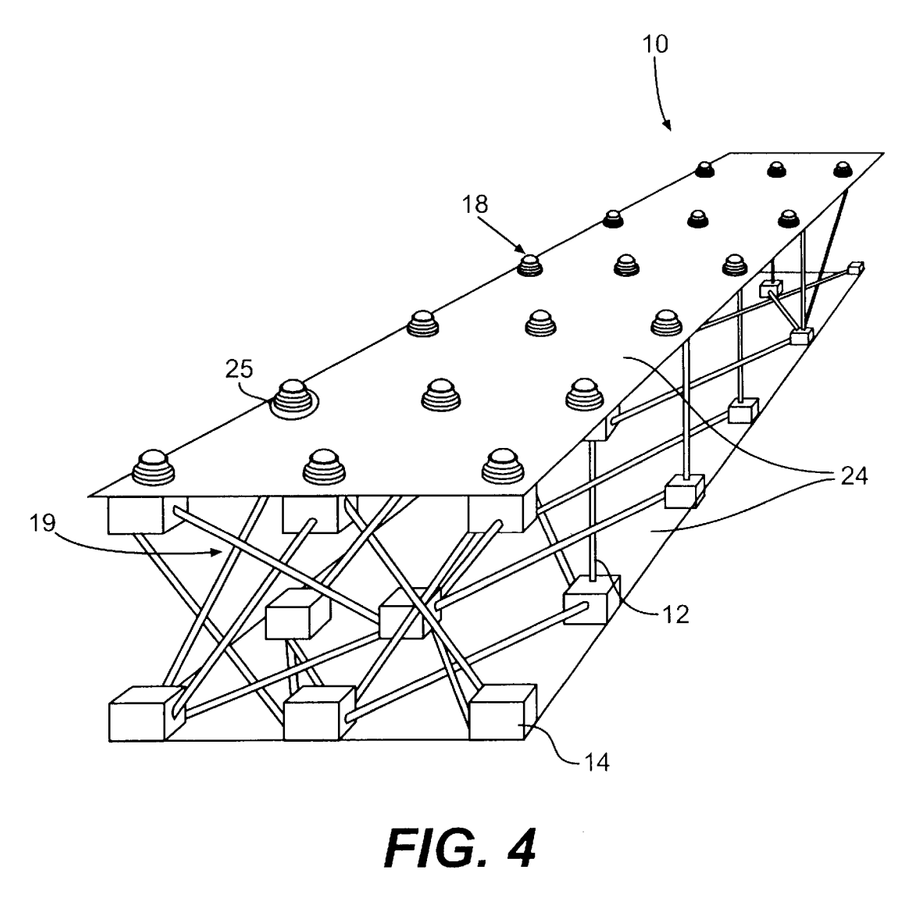
FIG. 4 is a perspective view illustration of a first variation of the preferred embodiment of the transfer device showing a fabric support according to the present invention.
Figure 5:
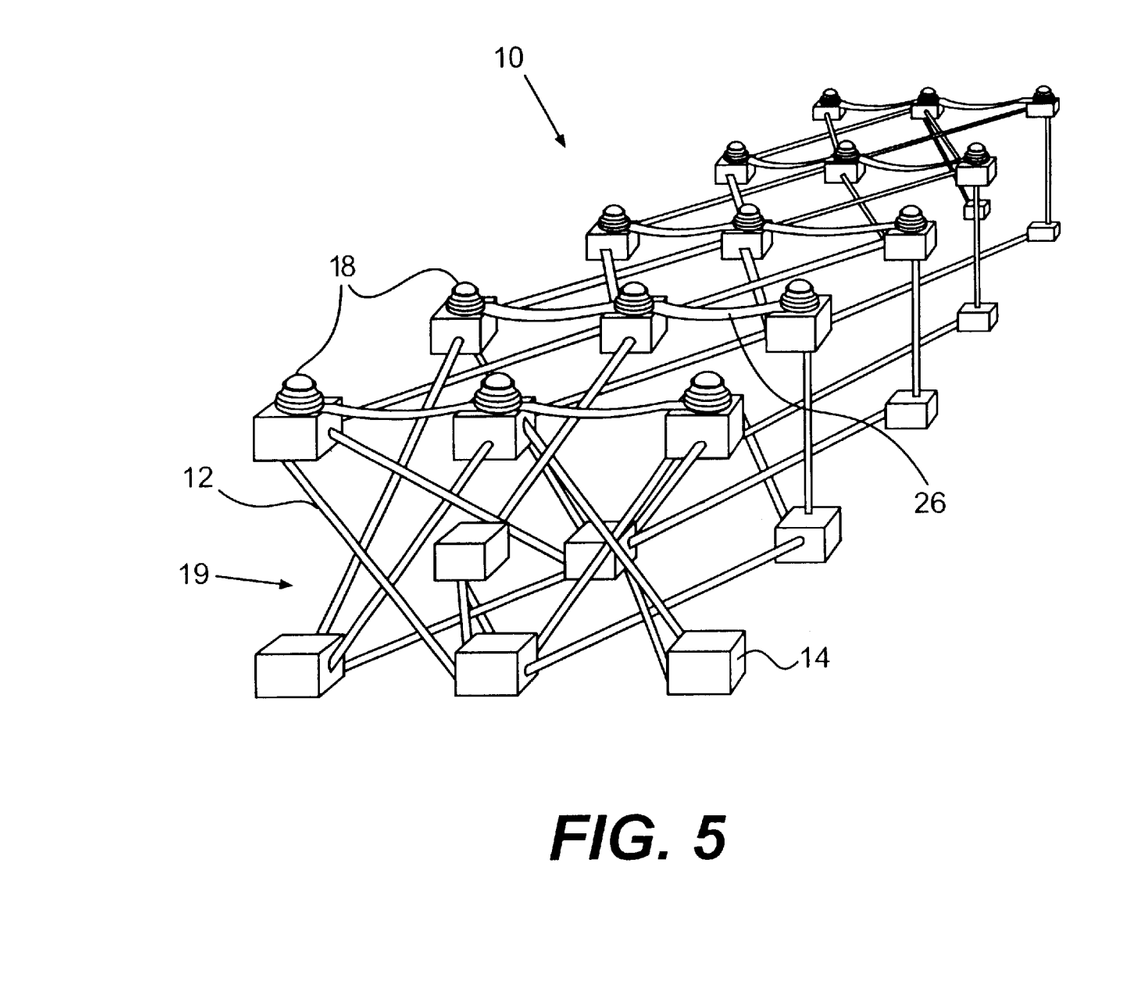
FIG. 5 is a perspective view illustration of a second variation of the preferred embodiment of the transfer device showing horizontal web supports and a staggered ball transfer configuration according to the present invention.

As illustrated, the design of transfer device 10 of the present invention allows it to rapidly deploy from the closed compact configuration to the open erect prism shaped configuration. In the closed compact configuration, transfer device 10 provides a unit that may be easily stored and transported. In the erect configuration, framework 19 of transfer device 10 provides a durable lightweight conveyor, defined by the dimensions of the upper surface of open frame 19, where each transfer ball 18 affixed to an external upper surface hub 14 facilitates conveyance of objects along the upper surface. Because transfer balls 18 receive and convey objects, such as cargo or individuals, it is preferred that they be constructed of a material which facilitates fluid-like motion. Again, transfer balls 18 attach to at least those hubs 14 positioned at the upper face of the framework in the open elongated configuration. Although transfer balls 18 may permanently attach to these hubs 14, it is preferred that balls 18 removably attach to hubs 14, by any conventional means, including, but not limited to stud mounts 22 or screw-type fasteners. To facilitate the transport of objects, transfer balls 18 may be disposed on each external upper surface hub 14, as illustrated in FIG. 4, or in a staggered configuration, as illustrated in FIG. 5. Instead of employing transfer balls 19, which permit object conveyance in any direction, conventional rollers may be disposed on external upper surface hubs 14 that permit object conveyance in only one longitudinal direction, i.e., only along the length of the erect transfer device.

The practical design of transfer device 10 provides an easily deployable unit, which may be articulated to its open elongated configuration by a single individual, regardless of technical background. Once erected, the unit enjoys great mobility, because it is constructed of lightweight, durable materials, such as lightweight metals, plastics or composites. Indeed, a single individual may transport and manipulate the unit at the load/unload site to transport cargo or other objects (i.e., sliding the erect unit adjacent a vehicle, storage facility, accident site, etc.). Moreover, the compactness of transfer device 10, in its collapsed configuration, provides for eased transport and storage, as transport device 10 may be stored in either a transport vehicle or a storage facility.

Various modifications can be made to the transfer device of the present invention without departing from the scope and spirit of the invention. For example, as illustrated in FIGS. 3–8, the upper surface of the transfer device permits a variety of modifications that increase the adaptability as well as the strength of the conveying surface of the transfer device.

Figure 3:
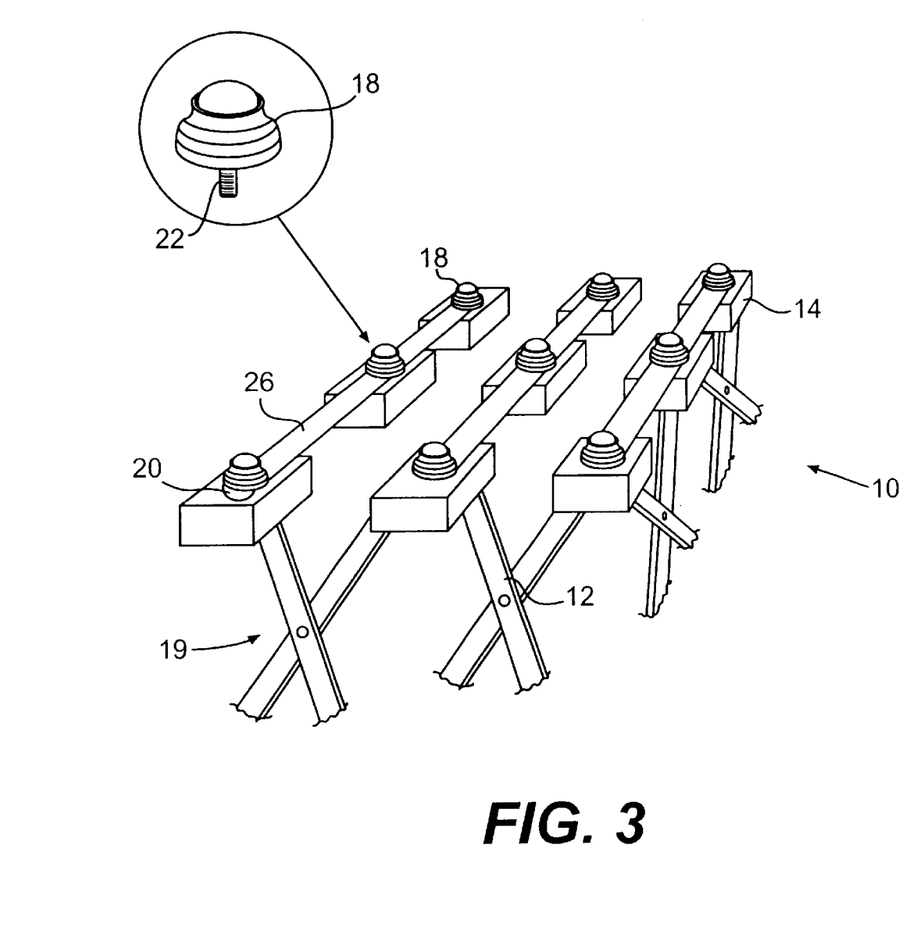
FIG. 3 is a perspective view illustration of a preferred embodiment of a transfer device in the open elongated configuration according to the present invention.
Figure 6:
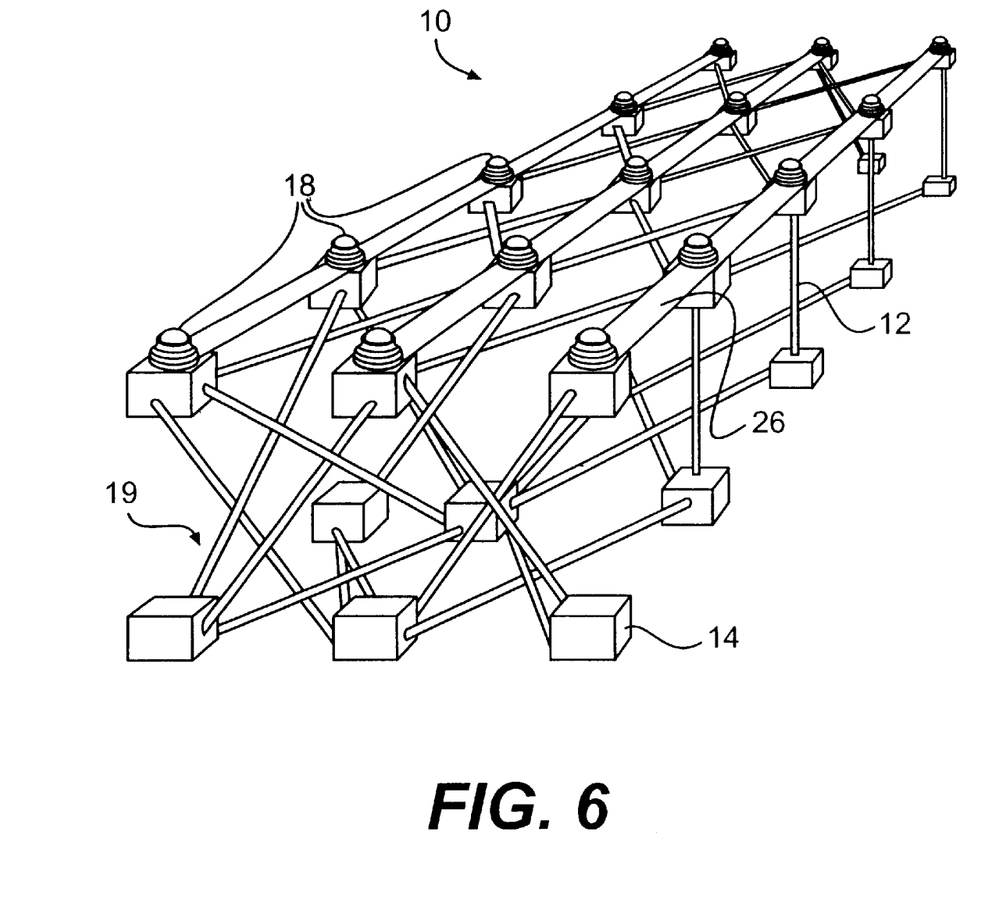
FIG. 6 is a perspective view illustration of the second variation of the preferred embodiment of the transfer device showing vertical web supports according to the present invention.
Figure 7:
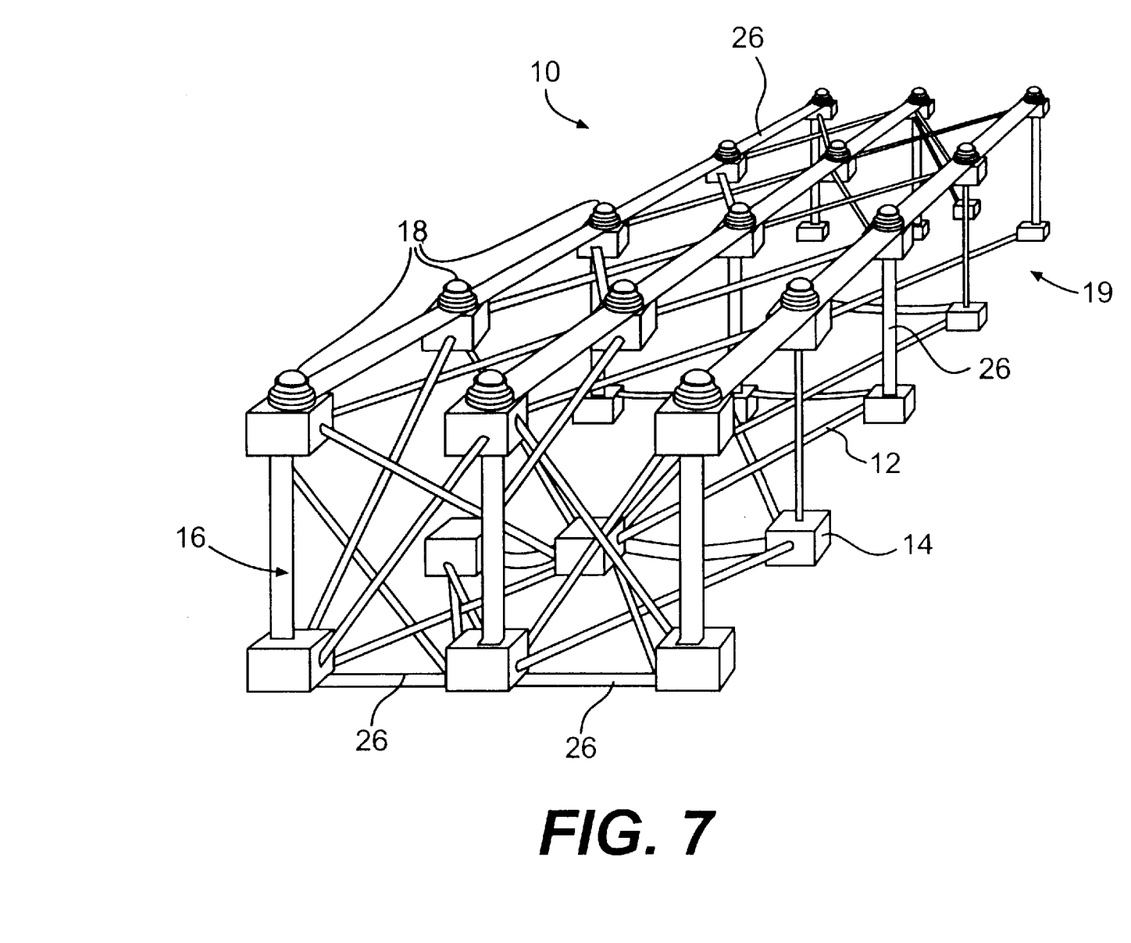
FIG. 7 is a perspective view illustration of the second variation of the preferred embodiment of the transfer device showing a fastening mechanism as well as vertical and horizontal web supports according to the present invention.
Figure 8:
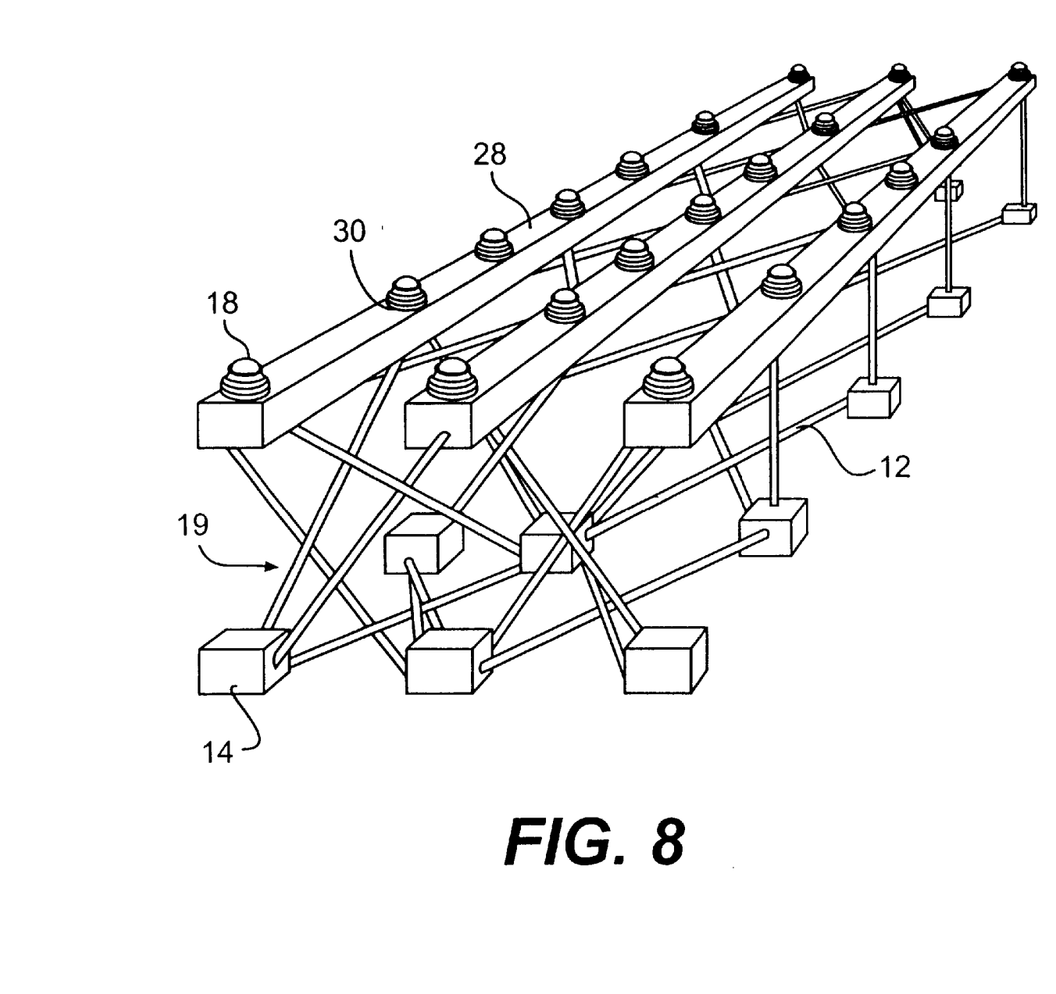
FIG. 8 is a perspective view illustration of a third variation of the preferred embodiment of the transfer device showing rails along the upper surface of the open transfer device according to the present invention.

As illustrated in FIG. 4, transfer device 10 enjoys increased adaptability and strength by disposing fabric support 24 on the upper surface of open frame 19, between ball transfers 18 and hubs 14. Fabric support 24 affixes to hubs 14 and includes holes 25 to accommodate ball transfers 18. Fabric support 24 is preferably made of a durable yet flexible material to permit eased manipulation between the closed compact configuration and the open erect configuration. Alternatively, web support 26 may be affixed to opposing hubs 14 to strengthen the conveying capabilities of transfer device 10, as illustrated in FIGS. 3 and 5–7. Web strap 26 may be positioned between horizontally opposing hubs, as illustrated in FIG. 5, between vertically opposing hubs, as illustrated in FIGS. 3 and 6, or between both, as illustrated in FIG. 7. Web strap 26 is also preferably made of a durable yet flexible material to permit eased manipulation between the closed compact configuration and the open erect configuration. The upper surface of the open transfer device 10 may also be strengthened by positioning metallic rails 28 on those hubs 14 positioned along the upper surface plane of erect frame 19, as illustrated in FIG. 8. As depicted, each rail 28 includes holes 30 in order to simultaneously accommodate ball transfers 18 and reside along contiguous hubs 14. For additional strength, each of the above variations to transfer device 10 may be used in conjunction with a fastening mechanism 16 or other locking device, such as a becket latch, positioned between opposing hubs 14 in the open elongated configuration, as illustrated in FIG. 7.

In addition to strengthening the upper surface of frame 19, the dimensions of the transfer surface may be adapted and modified by positioning transfer device 10 on either its horizontal or vertical sides to offer differing profiles of open frame 19. For example, an open transfer device may have a taller configuration with a reduced upper surface area when vertically positioned. Regardless of the particular configurations, cargo or other objects may easily be transported along the ball transfers or other similar conveying means affixed to one or more upper surface hubs of the open transfer device.

The dimensions of transfer surface device 10 also may be adapted and modified by varying the length of rods 12. Each of rods 38 are preferably of equal length and surface area so that framework 19 may be easily manipulated between the erect and compact configurations. The dimensions of rods 12, however, do not limit the size of the display framework in the erect configuration. For example, certain rods may include a telescoping member 12a residing within the interior of rod 12 and extending in relation to rod 12 in the erect open framework 19, as shown in FIG. 3. The telescoping member 12a, as disposed, possesses a smaller surface area than the interior of rod 12 so that the telescoping member 12a may easily move in relation to rod 12. Before or after extension, the telescoping member 12a is secured within rod 12 by a pin and hole configuration, where rod 12 and telescoping member 12a each include a hole 13a and 13b, respectively, for the receipt of the pin 15. Either one of the rod 12 or the telescoping member 12a includes a plurality of holes disposed at varying lengths, such that the extension of the telescoping member 12a may be controlled at different intervals. By varying the extension of the telescoping member 12a in relation to the hub 14, the size of the erect display framework is easily increased.

The adaptability of the transfer device may be further manipulated by controlling the vertical dimensions of the unit once erected. For example, to adjust the height of the erect transfer device, fastening mechanism 16 may include adjustable straps affixed to opposing hubs of the unit. These straps may include a becket latch or other fastening system that allows the user to adjust the height of one or more corners of the transfer device by adjusting the length of each adjustable strap. Alternatively, to maintain the height of the erect unit, a dead stop may be placed on fastening mechanism 16 between opposing hubs of the transfer device. In essence, the dead stop prevents the opposing hubs of the upper and lower surfaces of the erect transfer device from compacting in vertical height beyond a predetermined distance.

Figure 10:
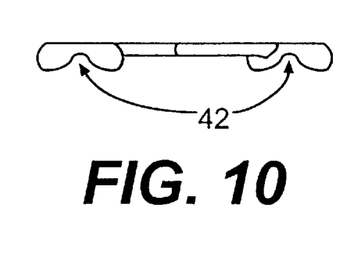
FIG. 10 is a perspective view illustration of the preferred embodiment of the transfer device showing the transport board according to the present invention.

For particular applications involving transport of patients from an accident scene, such as a mass casualty or chemical contamination, the transportation process involves additional concerns of patient care and comfort. To address these concerns, transport board 40 is provided that permits eased transport along transfer device 10. As illustrated in FIG. 10, transport board 40 includes roller ball track 42 that is configured to interact with and receive ball transfers 18 to ensure safe transport. Roller ball track 42 extends along the bottom surface of board 40.

Figure 9:
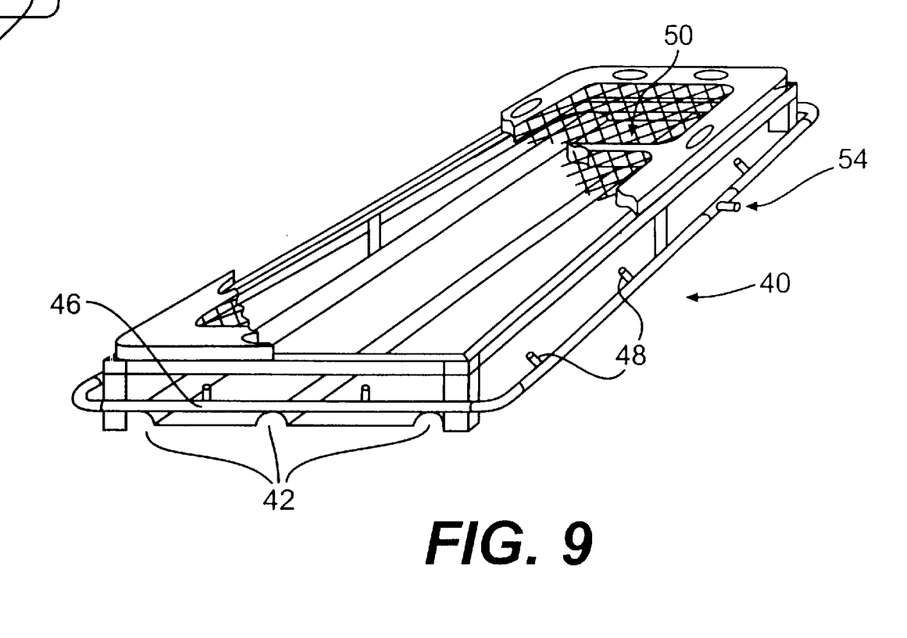
FIG. 9 is a perspective view illustration of the preferred embodiment of the transfer device showing a transport board according to the present invention.
Figure 11:
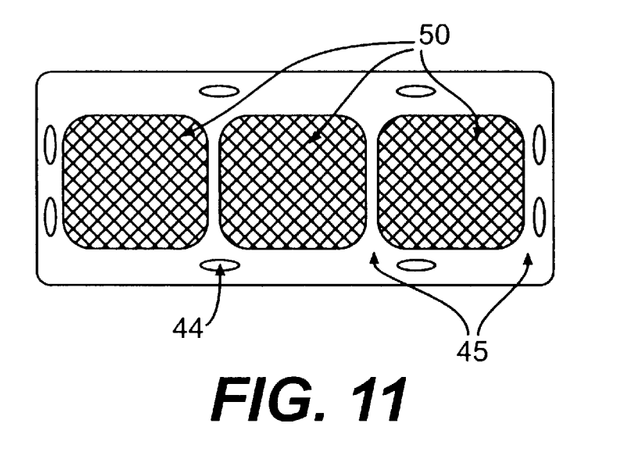
FIG. 11 is a perspective view illustration of the preferred embodiment of the transfer device showing the transport board according to the present invention.

As illustrated in FIG. 11, to facilitate movement to and/or from transfer device 10, board 40 also includes lifting handles 44. To reduce weight, board 40 is preferably constructed of fiberglass 45, plastic, or composite. For patients involved in mass chemical spills, immediate sprays of liquid may be applied, as board 40 may also be equipped with liquid storage pipes 46, nozzles 48, and mesh surfaces 50, as illustrated in FIG. 9. To activate the spray of liquid from nozzles 48 through mesh 50, liquid storage pipes 46 include an actuating handle 52. Pipe 46 receives liquid from a liquid source through connect/disconnect valve 54. As configured, board 40 provides a unique patient transfer board that, in combination with transfer device 10, transports a patient efficiently and safely.

It will be apparent to those skilled in the art that additional modifications and variations can be made in the transfer device of the present invention and in construction of this device without departing from the scope or spirit of the invention. Further, use of the transfer device is not limited to the shipping industry, as it may be used in any situation involving the receipt and conveyance of objects or individuals.

Other embodiments of the invention will be apparent to those skilled in the art from consideration of the specification and practice of the invention disclosed herein. It is intended that the specification and examples be considered as exemplary only, with a true scope and spirit of the invention being indicated by the following claims.

In the foregoing Description of Preferred Embodiments, various features of the invention are grouped together in a single embodiment for purposes of streamlining the disclosure. This method of disclosure is not to be interpreted as reflecting an intention that the claimed invention requires more features than are expressly recited in each claim. Rather, as the following claims reflect, inventive aspects lie in less than all features of a single foregoing disclosed embodiment. Thus, the following claims are herein incorporated, with each claim standing on its own as a separate preferred embodiment of the invention.

What is claimed is:

1. A rapid deploy transfer device adapted to receive and convey objects, the transfer device being movable between an elongated open configuration and a collapsed compact configuration, the transfer device in the open configuration having an upper surface capable of receiving and conveying objects, the transfer device comprising:
    rods, each rod being pivotally joined to another rod by a scissors connection intermediate the ends of said rods;
    hubs supported by the rods, each hub receiving an end portion of at least two rods, said rods being pivotally joined to said hubs, where each of said rods pivot in relation to said hub about a distinct axis of rotation;
    said rods being rotatable from the collapsed configuration where said rods are substantially parallel to one another to the erect open configuration;
    a hub retention element affixed to at least two adjacent hubs; and
    at least one transfer medium connected to at least one hub.

2. The transfer device recited in claim 1, wherein each rod is of substantially equal length and wherein said scissor connection is proximate the middle of each rod.

3. The transfer device recited in claim 1, wherein said at least one transfer medium is connected to hubs positioned along the upper surface of the transfer device.

4. The transfer device recited in claim 1, wherein the hub retention element comprises at least one strap.

5. A rapid deploy transfer device adapted to receive and convey objects, the transfer device being convertible between an erect open configuration and a collapsed compact configuration, the transfer device in the open configuration having an upper surface capable of receiving and conveying objects, the transfer device comprising:
    rods, each rod being pivotally joined to another rod by a scissors connection intermediate the ends of said rods;
    hubs, each hub receiving an end portion of at least two rods, said rods being pivotally joined to said hubs, where each of said rods pivot in relation to said hub about a distinct axis of rotation;
    said rods being rotatable from the collapsed configuration, where said rods are substantially parallel to one another and where said hubs are positioned adjacent one another at each end portion of the collapsed configuration, to the open erect configuration, where the hubs positioned proximate the top portion of the collapsed configuration descend downward toward the bottom portion of the transfer device when converting from the collapsed configuration to the erect configuration;
    a hub retention element affixed to at least two adjacent hubs; and
    at least one ball transfer connected to at least one hub.

6. A rapid deploy transfer device, comprising:
    a frame movable between a stowed configuration and a deployed configuration, the frame comprising:
        a plurality of struts, each strut comprising a first end, a second end, and an intermediate portion, wherein the intermediate portion of each strut is pivotably connected to the intermediate portion of another strut;
        a plurality of first hubs defining a first frame surface, each first hub receiving first ends of at least two respective struts, wherein each respective strut is pivotable with respect to the first hub about a distinct axis; and
        a plurality of second hubs defining a second frame surface, each second hub receiving second ends of at least two respective struts, wherein each respective strut is pivotable with respect to the second hub about a distinct axis;
    a hub retention element connecting one of at least two first hubs and at least two second hubs; and
    a transfer medium associated with the first frame surface.

7. The device of claim 6, wherein the transfer medium is disposed on at least one first hub.

8. The transfer device recited in claim 1, wherein the hub retention element comprises a fabric support affixed to at least one of the upper surface and the lower surface of the transfer device.

9. The transfer device recited in claim 1, wherein the hub retention element comprises rails disposed on hubs positioned along the upper surface of the transfer device.

10. The device of claim 6, wherein the transfer medium is configured to support a platform.

11. The device of claim 6, wherein the plurality of second hubs are configured to engage a support surface.

12. The device of claim 6, wherein the transfer medium is configured to engage a support surface in a rolling engagement.

13. The device of claim 6, wherein the plurality of second hubs are configured to support a platform.

14. The transfer device of claim 4, wherein the at least one strap is positioned between laterally adjacent hubs.

15. The transfer device of claim 4, wherein the at least one strap is positioned between longitudinally adjacent hubs.

16. The device of claim 15, wherein the height of the frame in the stowed configuration is greater than the height of the frame in the deployed configuration.

17. The device of claim 6, wherein at least one strut received by a first hub is pivotable about a first axis and wherein at least one other strut received by the first hub is pivotable about a second axis substantially perpendicular to the first axis.

18. The device of claim 17, wherein at least one other strut received by the first hub is pivotable about a third axis substantially parallel to the first axis.

19. The device of claim 18, wherein at least one other strut received by the first hub is pivotable about a fourth axis substantially perpendicular to the first axis.

20. The device of claim 6, wherein at least one strut received by a first hub is pivotable about a first axis and wherein at least one other strut received by the first hub is pivotable about a third axis substantially parallel to the first axis.

21. The device of claim 6, wherein at least one strut received by a second hub is pivotable about a fifth axis and wherein at least one other strut received by the second hub is pivotable about a sixth axis substantially perpendicular to the fifth axis.

22. The device of claim 21, wherein at least one other strut received by the second hub is pivotable about a seventh axis substantially parallel to the fifth axis.

23. The device of claim 22, wherein at least one other strut received by the second hub is pivotable about an eighth axis substantially perpendicular to the fifth axis.

24. The device of claim 6, wherein at least one strut received by a second hub is pivotable about a fifth axis and wherein at least one other strut received by the first hub is pivotable about a seventh axis substantially parallel to the first axis.

25. The device of claim 6, wherein the struts comprise a material chosen from metals, plastics, and composites.

26. The device of claim 6, wherein the hub retention element comprises at least one strap connecting longitudinally adjacent hubs.

* * * * *

UNITED STATES PATENT AND TRADEMARK OFFICE
CERTIFICATE OF CORRECTION

| | | |
|---|---|---|
| PATENT NO. | : 6,729,460 B2 | Page 1 of 1 |
| APPLICATION NO. | : 09/819618 | |
| DATED | : May 4, 2004 | |
| INVENTOR(S) | : Richard A. Esser et al. | |

It is certified that error appears in the above-identified patent and that said Letters Patent is hereby corrected as shown below:

In claim 8, column 8, lines 31-34, delete the claim in its entirety and insert therefor --The device of claim 7, wherein the transfer medium is disposed on each first hub.--.

In claim 9, column 8, lines 35-37, delete the claim in its entirety and insert therefor --The device of claim 6, wherein the transfer medium comprises a rolling element.--.

In claim 14, column 8, lines 46-47, delete the claim in its entirety and insert therefor --The device of claim 6, wherein the frame defines a length, a width, and a height and wherein the length, the width, and the height of the frame in the stowed configuration are different from the length, the width, and the height of the frame in the deployed configuration.--.

In claim 15, column 8, lines 48-49, delete the claim in its entirety and insert therefor --The device of claim 14, wherein the length and the width of the frame in the stowed configuration are less than the length and the width of the frame in the deployed configuration.--.

Signed and Sealed this

Seventeenth Day of October, 2006

JON W. DUDAS
*Director of the United States Patent and Trademark Office*